(12) United States Patent
Ke et al.

(10) Patent No.: US 8,675,165 B2
(45) Date of Patent: Mar. 18, 2014

(54) LIQUID CRYSTAL DISPLAY UNIT HAVING PARTICULAR SUB-PIXEL UNITS

(75) Inventors: Bo-Wen Ke, Taichung (TW); Yi-Jhih Ye, Taipei (TW); Hung-Lung Hou, Changhua County (TW); Ya-Ling Hsu, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 796 days.

(21) Appl. No.: 12/944,735

(22) Filed: Nov. 12, 2010

(65) Prior Publication Data

US 2012/0057112 A1 Mar. 8, 2012

(30) Foreign Application Priority Data

Sep. 2, 2010 (TW) ................................. 99129729 A

(51) Int. Cl.
*G02F 1/1343* (2006.01)
*G02F 1/1335* (2006.01)

(52) U.S. Cl.
USPC .............................. 349/141; 349/142; 349/117

(58) Field of Classification Search
CPC ...................... G02F 1/134363; G02F 1/133707; G02F 1/136213; G02F 1/134327; G02F 1/134309; G02F 1/13363; G02F 1/133634
USPC ........................................... 349/141, 42, 117
See application file for complete search history.

(56) References Cited

U.S. PATENT DOCUMENTS

| | | | |
|---|---|---|---|
| 6,188,459 B1 | 2/2001 | Kim | |
| 6,795,150 B2 | 9/2004 | Yanagawa et al. | |
| 7,414,688 B2 | 8/2008 | Kim | |
| 7,420,635 B2 * | 9/2008 | Ozawa | 349/114 |
| 7,639,327 B2 | 12/2009 | Ozawa | |
| 7,830,485 B2 * | 11/2010 | You et al. | 349/141 |
| 8,223,305 B2 * | 7/2012 | Park et al. | 349/129 |
| 2012/0162157 A1 * | 6/2012 | Chuang et al. | 345/204 |

FOREIGN PATENT DOCUMENTS

KR 20090125326 12/2009

OTHER PUBLICATIONS

Zhibing Ge et al., "Modeling of Blue Phase Liquid Crystal Displays", Journal of Display Technology, vol. 5, No. 7, Jul. 2009, 250-256.
"First Office Action of China Counterpart Application", issued on Jul. 13, 2011, p. 1-p. 8, in which the listed references were cited.

* cited by examiner

*Primary Examiner* — Mike Qi
(74) *Attorney, Agent, or Firm* — Jiang Chyun IP Office

(57) ABSTRACT

A liquid crystal display unit including a pixel unit and a quasi-isotropic liquid crystal layer with Kerr effect is provided. The pixel unit includes sub-pixel units, each sub-pixel unit at least has a first transmissive region and a second transmissive region. Each sub-pixel unit includes a switch, a pixel electrode, and a common electrode. Each pixel electrode has first stripe patterns. The common electrode has second stripe patterns, wherein the first stripe patterns and the second stripe patterns are arranged alternately. In the first transmissive region, width of each first stripe pattern is L1, while a gap between each first stripe pattern and the corresponding second stripe pattern adjacent thereto is S1. In the second transmissive regions, width of each first stripe pattern is L2, while a gap between each first stripe pattern and the corresponding second stripe pattern adjacent thereto is S2, wherein L1≠L2 or S1≠S2 or L1/S1≠L2/S2.

25 Claims, 7 Drawing Sheets

| k=1e-9 | LS33 | LS34 | LS35 | LS36 |
|---|---|---|---|---|
| Vmax | 74 | 90 | 99 | 111 |
| ΔV(99%)/Vmax | 3.40% | 3.80% | 3.20% | 3.10% |
| ΔV(97%)/Vmax | 5.90% | 6.40% | 5.90% | 5.70% |

| k=1e-9 | 2:0:5:0.4 | 2:1:3:2.2 | 2:0.2:4.2:0.8 |
|---|---|---|---|
| Vmax | 96 | 109 | 110 |
| ΔV(99%)/Vmax | 6.70% | 14.00% | 18.40% |
| ΔV(97%)/Vmax | 10.50% | 18.90% | 22.00% |

LIQUID CRYSTAL DISPLAY UNIT HAVING PARTICULAR SUB-PIXEL UNITS

CROSS-REFERENCE TO RELATED APPLICATION

This application claims the priority benefit of Taiwan application serial no. 99129729, filed on Sep. 2, 2010. The entirety of the above-mentioned patent application is hereby incorporated by reference herein and made a part of this specification.

BACKGROUND OF THE INVENTION

1. Field of the Present Invention

The present invention relates to a liquid crystal display unit. More particularly, the present invention relates to a liquid crystal display unit having a quasi-isotropic liquid crystal layer.

2. Description of Related Art

In the development of the display, with the progress in the optoelectronic techniques and the semiconductor manufacturing techniques, the liquid crystal display with the advantages of high definition, optimal space utilization, low power consumption, and no radiation has gradually become the main stream of the market. Currently, liquid crystal materials such as vertically aligned (VA) liquid crystal, twisted nematic (TN) liquid crystal, Cholesteric Liquid Crystal and so on are commonly used in liquid crystal displays. Since optical property and electrical characteristics of different liquid crystal materials are different from each other, various designs of active device array substrate are used to optimize display quality of the liquid crystal displays.

FIG. 1A is a voltage-transmittance (V-T) curve of vertically aligned (VA) liquid crystal. Referring to FIG. 1A, when VA liquid crystal is driven by different voltage, transmittance thereof changes accordingly. Take a liquid crystal display capable of displaying 256 gray levels as an example, the voltage corresponding to transmittance of 100% is defined as driving voltage $V_{L255}$ corresponding to gray level L255, while the voltage corresponding to transmittance of 0% is defined as driving voltage $V_{L0}$ corresponding to gray level L0. As shown in FIG. 1A, when the driving voltage $V_{L255}$ applied to liquid crystal shifts slightly, transmittance of liquid crystal may not change significantly. Accordingly, display quality of the liquid crystal display is stable when the gray level L255 is displayed.

FIG. 1B is a voltage-transmittance (V-T) curve of Kerr effect liquid crystal. Referring to FIG. 1A and FIG. 1B, Kerr effect liquid crystal (e.g. blue phase liquid crystal) and the VA liquid crystal have different optical properties and electrical characteristics. Transmittance of Kerr effect liquid crystal oscillates when the driving voltage increases. Take a liquid crystal display capable of displaying 0-255 gray levels as an example, the voltage corresponding to transmittance of 100% is defined as driving voltage $V_{L255}$ corresponding to gray level L255, while the voltage corresponding to transmittance of 0% is defined as driving voltage $V_{L0}$ corresponding to gray level L0. As shown in FIG. 1B, when the driving voltage $V_{L255}$ applied to liquid crystal shifts slightly, transmittance of liquid crystal changes significantly. Accordingly, display quality of the liquid crystal display is quite unstable when the gray level L255 is displayed.

How to solve the problem of unstable display quality is an important issue of research and development.

SUMMARY OF THE INVENTION

The invention is directed to a liquid crystal display unit having a quasi-isotropic liquid crystal layer.

The present invention provides a liquid crystal display unit including a pixel unit and a quasi-isotropic liquid crystal layer. The pixel unit includes a plurality of sub-pixel units, each of the sub-pixel units at least has a first transmissive region and a second transmissive region. Each of the sub-pixel units includes a switch, a pixel electrode, and a common electrode. The pixel electrode is electrically connected to the switch and has a plurality of first stripe patterns. The common electrode is electrically insulated from the pixel electrode and has a plurality of second stripe patterns, wherein the first stripe patterns and the second stripe patterns are arranged alternately. In the first transmissive region, a width of each of the first stripe patterns is L1, while a gap between each of the first stripe patterns and one of the second stripe patterns adjacent thereto is S1. In the second transmissive regions, a width of each of the first stripe patterns is L2, while a gap between each of the first stripe patterns and one of the second stripe patterns adjacent thereto is S2, wherein $L1 \neq L2$ or $S1 \neq S2$ or $L1/S1 \neq L2/S2$. The quasi-isotropic liquid crystal layer is disposed above the sub-pixel units. The quasi-isotropic liquid crystal layer is optically isotropic when no voltage is applied thereto, while the quasi-isotropic liquid crystal layer is optically anisotropic when a driving voltage is applied thereto.

According to an embodiment of the present invention, a birefringence ($\Delta n$) of the quasi-isotropic liquid crystal layer is proportional to an electric field (E) between the pixel electrode and the common electrode. According to another embodiment of the present invention, a birefringence ($\Delta n$) of the quasi-isotropic liquid crystal layer is proportional to square of an electric field ($E^2$) between the pixel electrode and the common electrode.

In one embodiment of the invention, the switch includes a thin film transistor, and the first stripe patterns are electrically connected.

In one embodiment of the invention, the switch includes two thin film transistors, the first stripe patterns is divided into sub-pixel electrodes electrically insulated from each other. Each of the thin film transistors is electrically connected to one of the sub-pixel electrodes respectively, and parts of the first stripe patterns belonging to a same sub-pixel electrode are electrically connected.

In one embodiment of the invention, one of the sub-pixel electrodes is located in one of the first transmissive regions, and the other one of the sub-pixel electrodes is located in one of the second transmissive regions.

In one embodiment of the invention, a voltage-transmittance curve VT1 of the quasi-isotropic liquid crystal layer within the first transmissive regions is different from a voltage-transmittance curve VT2 of the quasi-isotropic liquid crystal layer within the second transmissive regions.

In one embodiment of the invention, an area of each of the first transmissive regions is A1, an area of each of the second transmissive regions is A2, and an effective voltage-transmittance curve VT of the quasi-isotropic liquid crystal layer within each of the sub-pixel units equals to [(VT1×A1)+(VT2×A2)]/(A1+A2).

According to an embodiment of the present invention, L1=L2 and $S1 \neq S2$.

In an embodiment of the invention, the area of each of the first transmissive regions is substantially equal to that of each of the second transmissive regions.

In an embodiment of the invention, the area of each of the first transmissive regions is different from that of each of the second transmissive regions.

In one embodiment of the present invention, the quasi-isotropic liquid crystal layer is a blue phase liquid crystal layer.

In one embodiment of the present invention, each of the sub-pixel units further includes a third transmissive region, in the third transmissive regions, a width of each of the first stripe patterns is L3, while a gap between each of the first stripe patterns and one of the second stripe patterns adjacent thereto is S3, wherein $L1/S1 \neq L2/S2 \neq L3/S3$. For instance, $L1=L2=L3$ and $S1 \neq S2 \neq S3$ In one embodiment of the invention, the switch includes a thin film transistor, and the first stripe patterns are electrically connected.

In one embodiment of the invention, the switch includes three thin film transistors, the first stripe patterns is divided into three sub-pixel electrodes electrically insulated from each other. Each of the thin film transistors is electrically connected to one of the sub-pixel electrodes respectively, and parts of the first stripe patterns belonging to a same sub-pixel electrode are electrically connected.

In one embodiment of the invention, a voltage-transmittance curve VT1 of the quasi-isotropic liquid crystal layer within the first transmissive regions, a voltage-transmittance curve VT2 of the quasi-isotropic liquid crystal layer within the second transmissive regions and a voltage-transmittance curve VT3 of the quasi-isotropic liquid crystal layer within the third transmissive regions are different from each other.

In one embodiment of the invention, an area of each of the first transmissive regions is A1, an area of each of the second transmissive regions is A2, an area of each of the third transmissive regions is A3, and an effective voltage-transmittance curve VT of the quasi-isotropic liquid crystal layer within each of the sub-pixel units equals to $[(VT1 \times A1)+(VT2 \times A2)+(VT3 \times A3)]/(A1+A2+A3)$.

In one embodiment of the invention, a Kerr constant of the quasi-isotropic liquid crystal layer is 1e-8, the quasi-isotropic liquid crystal layer is driven by a driving voltage V, and the driving voltage V is between a driving voltage interval defined by a minimum driving voltage Vmin and a maximum driving voltage Vmax. The transmittance of the quasi-isotropic liquid crystal layer within each of the sub-pixel units is Tmax when the quasi-isotropic liquid crystal layer is driven by the maximum driving voltage Vmax. When the transmittance of the quasi-isotropic liquid crystal layer within each of the sub-pixel units is 99%*Tmax, a voltage difference between the driving voltage V and the maximum driving voltage Vmax is $\Delta V$, and $(\Delta V/Vmax) > 2.9\%$.

In one embodiment of the invention, a Kerr constant of the quasi-isotropic liquid crystal layer is 1e-8, the quasi-isotropic liquid crystal layer is driven by a driving voltage V, and the driving voltage V is between a driving voltage interval defined by a minimum driving voltage Vmin and a maximum driving voltage Vmax. The transmittance of the quasi-isotropic liquid crystal layer within each of the sub-pixel units is Tmax when the quasi-isotropic liquid crystal layer is driven by the maximum driving voltage Vmax. When the transmittance of the quasi-isotropic liquid crystal layer within each of the sub-pixel units is 97%*Tmax, a voltage difference between the driving voltage V and the maximum driving voltage Vmax is $\Delta V$, and $(\Delta V/Vmax) > 5.4\%$.

In one embodiment of the invention, a Kerr constant of the quasi-isotropic liquid crystal layer is 1e-9, the quasi-isotropic liquid crystal layer is driven by a driving voltage V, and the driving voltage V is between a driving voltage interval defined by a minimum driving voltage Vmin and a maximum driving voltage Vmax. The transmittance of the quasi-isotropic liquid crystal layer within each of the sub-pixel units is Tmax when the quasi-isotropic liquid crystal layer is driven by the maximum driving voltage Vmax. When the transmittance of the quasi-isotropic liquid crystal layer within each of the sub-pixel units is 99%*Tmax, a voltage difference between the driving voltage V and the maximum driving voltage Vmax is $\Delta V$, and $(\Delta V/Vmax) > 3.8\%$.

In one embodiment of the invention, a Kerr constant of the quasi-isotropic liquid crystal layer is 1e-9, the quasi-isotropic liquid crystal layer is driven by a driving voltage V, and the driving voltage V is between a driving voltage interval defined by a minimum driving voltage Vmin and a maximum driving voltage Vmax. The transmittance of the quasi-isotropic liquid crystal layer within each of the sub-pixel units is Tmax when the quasi-isotropic liquid crystal layer is driven by the maximum driving voltage Vmax. When the transmittance of the quasi-isotropic liquid crystal layer within each of the sub-pixel units is 97%*Tmax, a voltage difference between the driving voltage V and the maximum driving voltage Vmax is $\Delta V$, and $(\Delta V/Vmax) > 6.4\%$.

By adjusting L/S ratio of the pixel electrodes, transmissive regions having different VT curves may be obtained by the present application and the effective VT curve of liquid crystal display units may be optimized.

It is to be understood that both the foregoing general descriptions and the following detailed embodiments are exemplary and are, together with the accompanying drawings, intended to provide further explanation of technical features and advantages of the present invention.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

The First Embodiment

Figure 1A:
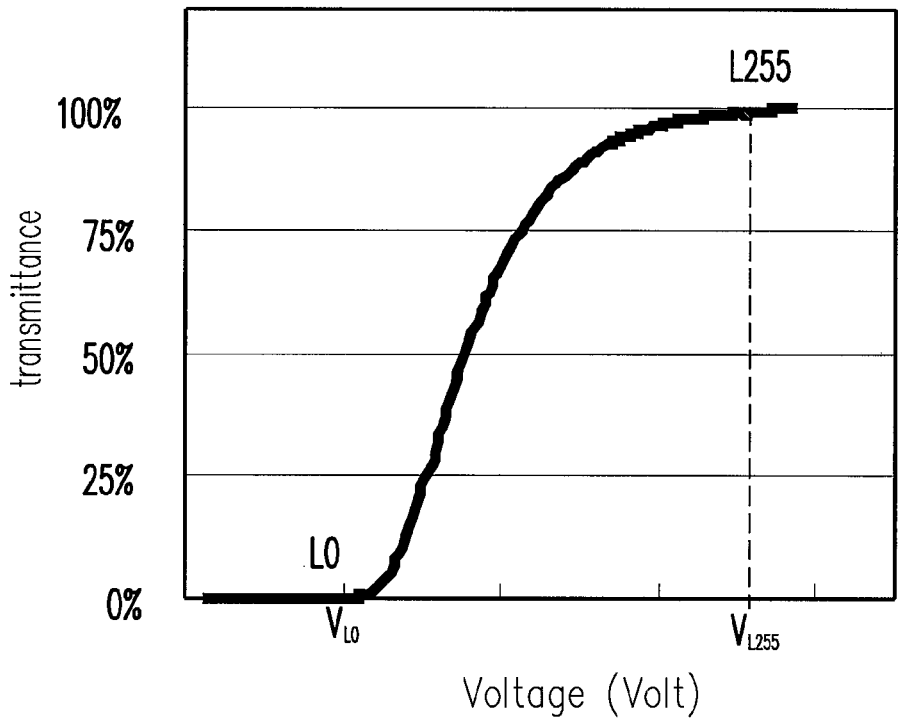
FIG. 1A is a voltage-transmittance (V-T) curve of vertically aligned (VA) liquid crystal.
Figure 1B:
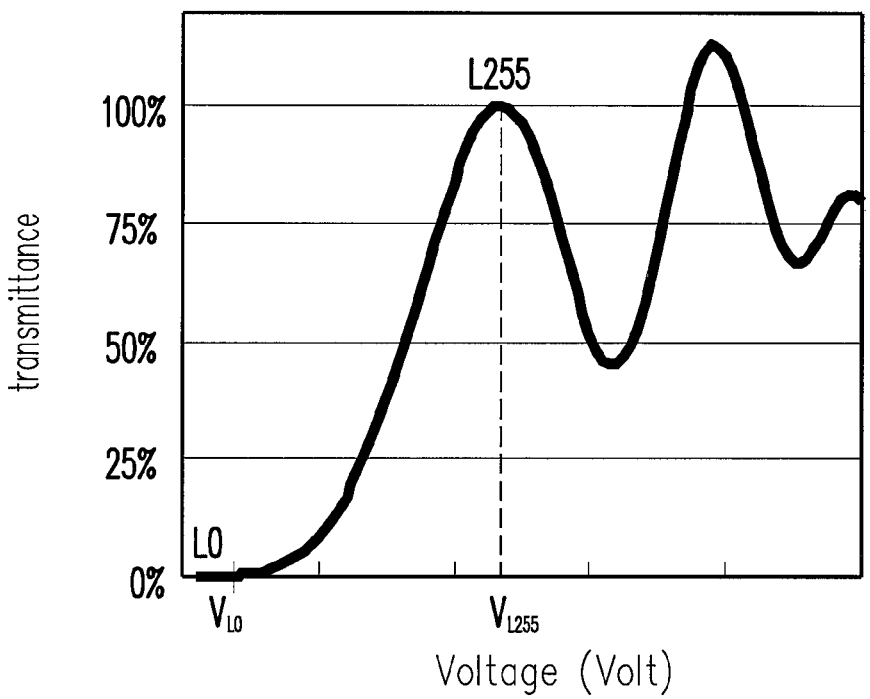
FIG. 1B is a voltage-transmittance (V-T) curve of Kerr effect liquid crystal.
Figure 2:
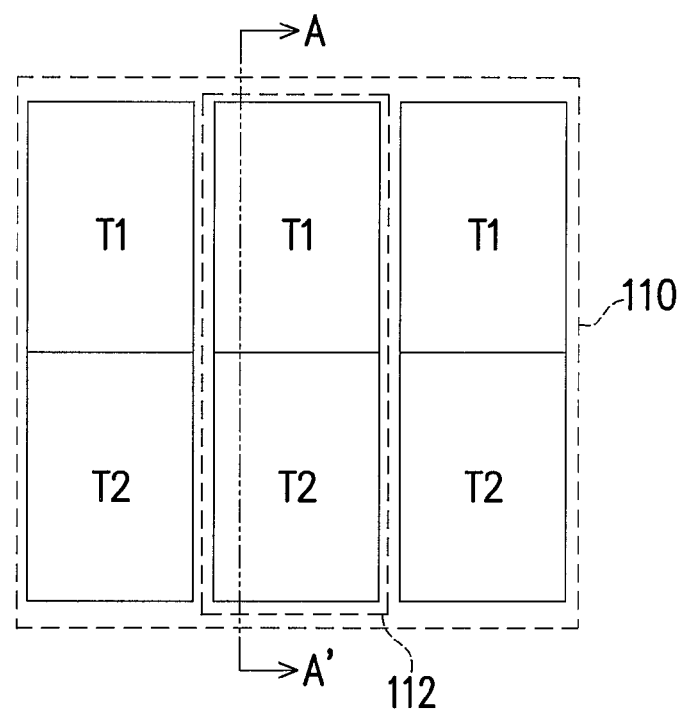
FIG. 2 is a schematic view of a liquid crystal display unit according to the first embodiment of the present invention.
Figure 2:
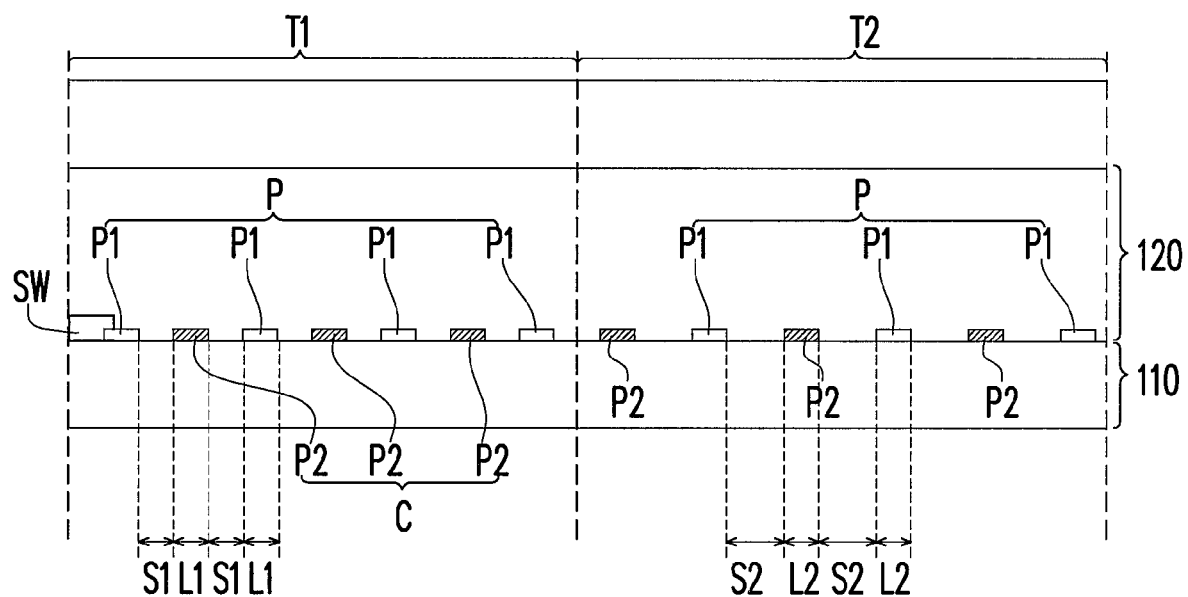

FIG. 2 is a schematic view of a liquid crystal display unit according to the first embodiment of the present invention. Referring to FIG. 2, the liquid crystal display unit 100 of the present embodiment includes a pixel unit 110 and a quasi-isotropic liquid crystal layer 120. The pixel unit 110 includes a plurality of sub-pixel units 112, each of the sub-pixel units 112 at least has a first transmissive region T1 and a second transmissive region T2. Each of the sub-pixel units 112 includes a switch SW, a pixel electrode P, and a common electrode C. The pixel electrode P is electrically connected to the switch SW and has a plurality of first stripe patterns P1. The common electrode C is electrically insulated from the pixel electrode P and has a plurality of second stripe patterns P2, wherein the first stripe patterns P1 and the second stripe patterns P2 are arranged alternately. In the first transmissive region T1, a width of each of the first stripe patterns P1 is L1, while a gap between each of the first stripe patterns P1 and one of the second stripe patterns P2 adjacent thereto is S1. In the second transmissive regions T2, a width of each of the first stripe patterns P1 is L2, while a gap between each of the first stripe patterns P1 and one of the second stripe patterns P2 adjacent thereto is S2, wherein L1≠L2 or S1≠S2 or L1/S1≠L2/S2. The quasi-isotropic liquid crystal layer 120 is disposed above the sub-pixel units 112. The quasi-isotropic liquid crystal layer 120 is optically isotropic when no voltage is applied thereto, while the quasi-isotropic liquid crystal layer 120 is optically anisotropic when a driving voltage is applied thereto.

In the present embodiment, in the first transmissive regions T1, the width of each of the second stripe patterns P2 is substantially equal to that of each of the first stripe patterns P1 (i.e. both of P1 and P2 are equal to L1). However, in other embodiment of the present application, the width of each of the second stripe patterns P2 may not equal to that of each of the first stripe patterns P1. Similarly, in the second transmissive regions T2, the width of each of the second stripe patterns P2 is substantially equal to that of each of the first stripe patterns P1 (i.e. both of P1 and P2 are equal to L1). However, in other embodiment of the present application, the width of each of the second stripe patterns P2 may not equal to that of each of the first stripe patterns P1. For example, in the first transmissive regions T1, the width of each of the first stripe patterns P1 is about 3 micrometers, while the width of each of the second stripe patterns P2 is about 2 micrometer to 5 micrometers; and in the second transmissive regions T2, the width of each of the first stripe patterns P1 is about 3 micrometers, while the width of each of the second stripe patterns P2 is about 2 micrometer to 5 micrometers. Certainly, widths of the first stripe patterns P1 and the second stripe patterns P2 are not limited to the above-mentioned values. By using suitable relationship of widths of the first stripe patterns P1 and the second stripe patterns P2, voltage-transmittance curves VT1 and VT2 may be properly modulated.

For example, the birefringence (Δn) of the quasi-isotropic liquid crystal layer 120 is proportional to an electric field (E) between the pixel electrode P and the common electrode C. According to another embodiment of the present invention, the birefringence (Δn) of the quasi-isotropic liquid crystal layer 120 is proportional to square of an electric field ($E^2$) between the pixel electrode P and the common electrode C. In the present embodiment, the quasi-isotropic liquid crystal layer 120 is a blue phase liquid crystal layer or other suitable liquid crystal materials.

In the present embodiment, the switch SW of each of the sub-pixel units 112 includes a thin film transistor electrically connected to the first stripe patterns P 1. In other words, the first stripe patterns P1 in the first transmissive regions T1 and the second transmissive regions T2 of the sub-pixel units 112 are electrically connected to the same transistor and have substantially the same voltage level. However, the quantity and structure of the transistor used in the present application is not limited.

In other embodiments of the present application, parts of the first stripe patterns P1 located within the first transmissive region T1 constitute one sub-pixel electrode, while other parts of the first stripe patterns P1 located within the second transmissive region T2 constitute another sub-pixel electrode. The two sub-pixel electrodes located within the first transmissive region T1 and the second transmissive region T2 are electrically insulated from each other. In order to individually drive said two sub-pixel electrodes located within the first transmissive region T1 and the second transmissive region T2, the switch SW of each of the sub-pixel units 112 includes two thin film transistors, wherein one of the thin film transistors is electrically connected to one of the sub-pixel electrodes located within the first transmissive region T1, and another one of the thin film transistors is electrically connected to another one of the sub-pixel electrodes located within the second transmissive region T2. The quantity of sub-pixel electrodes of the sub-pixel units 112 is not limited in the present application, one ordinary skilled in the art may properly modify the layout of the sub-pixel units 112 according to design requirements of products.

In the present embodiment, in the first transmissive regions T1 and the second transmissive regions T2, widths of the first stripe patterns P1 and the second stripe patterns P2 are similar or substantially the same, i.e. L1≈L2. In addition, the gap between each of the first stripe patterns P1 in the first transmissive regions T1 and one of the second stripe patterns P2 adjacent thereto is different from gap between each of the first stripe patterns P1 in the second transmissive regions T2 and one of the second stripe patterns P2 adjacent thereto, i.e. S1≠S2. For example, widths L1 and L2 are about 3 micrometers, gap S1 is about 3 micrometers, and gap S2 is about 5 micrometers. In other words, width/gap ratio L1/S1 is about 3 micrometers/3 micrometers, and width/gap ratio L2/S2 is about 3 micrometers/5 micrometers. However, the first stripe patterns P1 and the second stripe patterns P2 in the first transmissive regions T1 and the second transmissive regions T2 used in the present application are not limited to have the same width, any values of L1, L2, S1, and S2 that satisfy the relationships L1≠L2, S1≠S2 or L1/S1≠L2/S2 are fallen within the scope of the invention. For example, when width/gap ratio L1/S1 is about 3 micrometers/3 micrometers (LS33) and width/gap ratio L2/S2 is about 6 micrometers/6 micrometers (LS66), although width/gap ratio L1/S1 is equal to width/gap ratio L2/S2, designs of LS33 and LS66 should be fallen within the scope of the invention because the relationship L1≠L2 or S1≠S2 is satisfied. In brief, as long as width L1 and width L2 are different, or gap S1 and gap S2 are different, or width/gap ratio L1/S1 and width/gap ratio L2/S2 are different, the designs of the first and second stripe patterns P1 and P2 should be fallen within the scope of the invention.

Figure 3A:
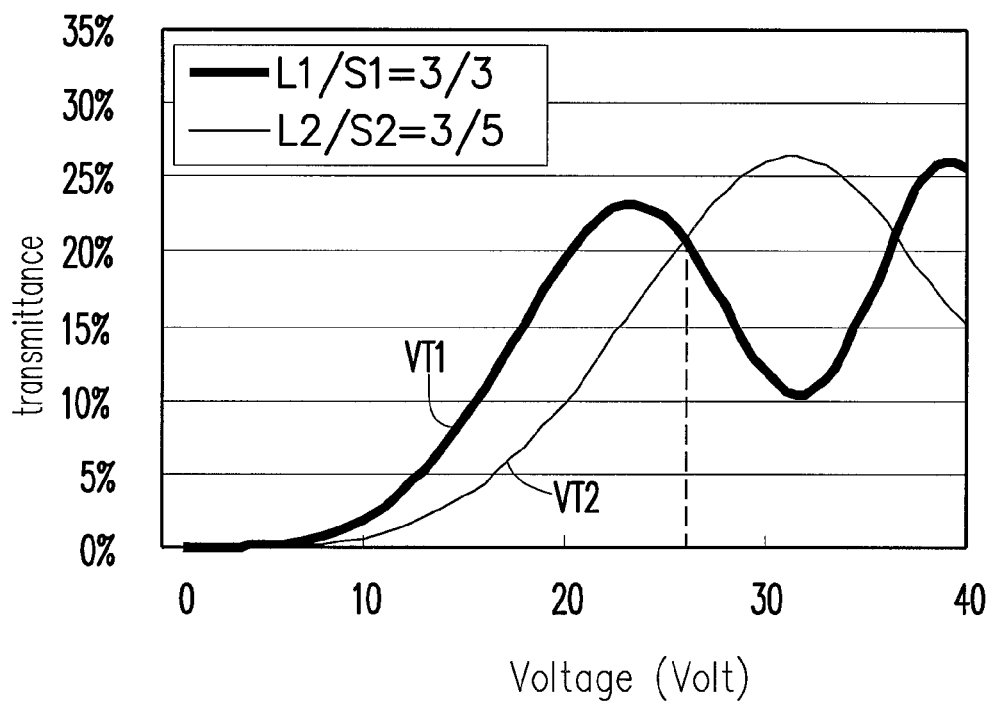
FIG. 3A illustrates voltage-transmittance (V-T) curves of the quasi-isotropic liquid crystal layer within the first transmissive regions and the second transmissive regions shown in FIG. 2.
Figure 3B:
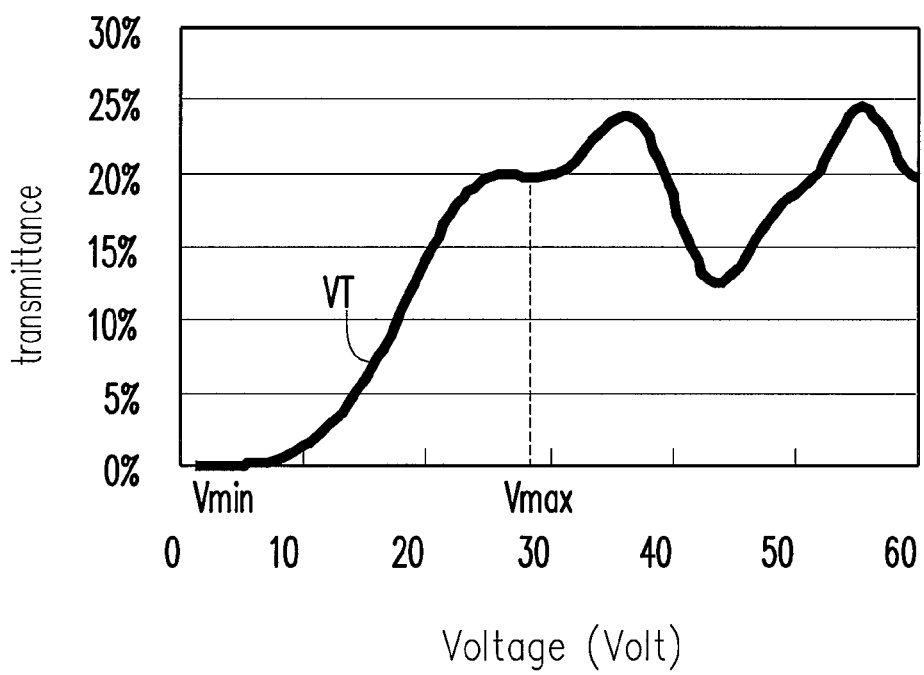
FIG. 3B illustrates the effective voltage-transmittance (V-T) curve of the quasi-isotropic liquid crystal layer within the sub-pixel unit shown in FIG. 2.

FIG. 3A illustrates voltage-transmittance (V-T) curves of the quasi-isotropic liquid crystal layer within the first transmissive regions and the second transmissive regions shown in FIG. 2. FIG. 3B illustrates the effective voltage-transmittance (V-T) curve of the quasi-isotropic liquid crystal layer within the sub-pixel unit shown in FIG. 2. Referring to FIG. 2 and FIG. 3A, when the width/gap ratio L1/S1 is about 3 micrometers/3 micrometers and width/gap ratio L2/S2 is about 3 micrometers/5 micrometers, a voltage-transmittance curve VT1 of the quasi-isotropic liquid crystal layer 120 within the first transmissive regions T1 is different from a voltage-transmittance curve VT2 of the quasi-isotropic liquid crystal layer 120 within the second transmissive regions T2. Since the areas of the first transmissive region T1 and the second transmissive region T2 of each of the sub-pixel units 112 is small, the first transmissive regions T1 and the second transmissive regions T2 are difficult to be identified by human eyes. The gray level displayed by each of the sub-pixel units 112 is related to the effective voltage-transmittance curve VT thereof (shown in FIG. 3B), and the effective voltage-transmittance curve VT of the quasi-isotropic liquid crystal layer 120 in the sub-pixel units 112 is related to the voltage-transmittance curve VT1, the voltage-transmittance curve VT2, area of the first transmissive regions T1 of each of the sub-pixel units 112, and area of the second transmissive regions T2 of each of the sub-pixel units 112. Specifically, the effective voltage-transmittance curve VT of the quasi-isotropic liquid crystal layer 120 in each of the sub-pixel unit 112 can be estimated by the following formula (1).

$$VT=[(VT1 \times A1)+(VT2 \times A2)]/(A1+A2) \tag{1}$$

When area of the first transmissive regions T1 within the sub-pixel unit 112 is similar or equal to that of second transmissive regions T2 within the sub-pixel unit 112 (i.e. A1≈A2), the effective voltage-transmittance curve VT of the quasi-isotropic liquid crystal layer 120 in each of the sub-pixel unit 112 is shown in FIG. 3B. It is known from the effective voltage-transmittance curve VT illustrated in FIG. 3B, when the quasi-isotropic liquid crystal layer 120 is driven by the maximum driving voltage Vmax and the maximum driving voltage Vmax applied to the quasi-isotropic liquid crystal layer 120 shifts slightly, transmittance of the quasi-isotropic liquid crystal layer 120 does not change significantly. Accordingly, display quality of the liquid crystal display is quite stable when the quasi-isotropic liquid crystal layer 120 is driven by the maximum driving voltage Vmax.

It is note that the area A1 of the first transmissive region T1 is not necessary to be the same as the area A2 of the second transmissive region T2. By properly modified the areas of the first transmissive regions T1 and the second transmissive regions T2 in accordance with design requirements of products, one ordinary skilled in the art can obtain desired effective voltage-transmittance curve VT.

Figure 3C:
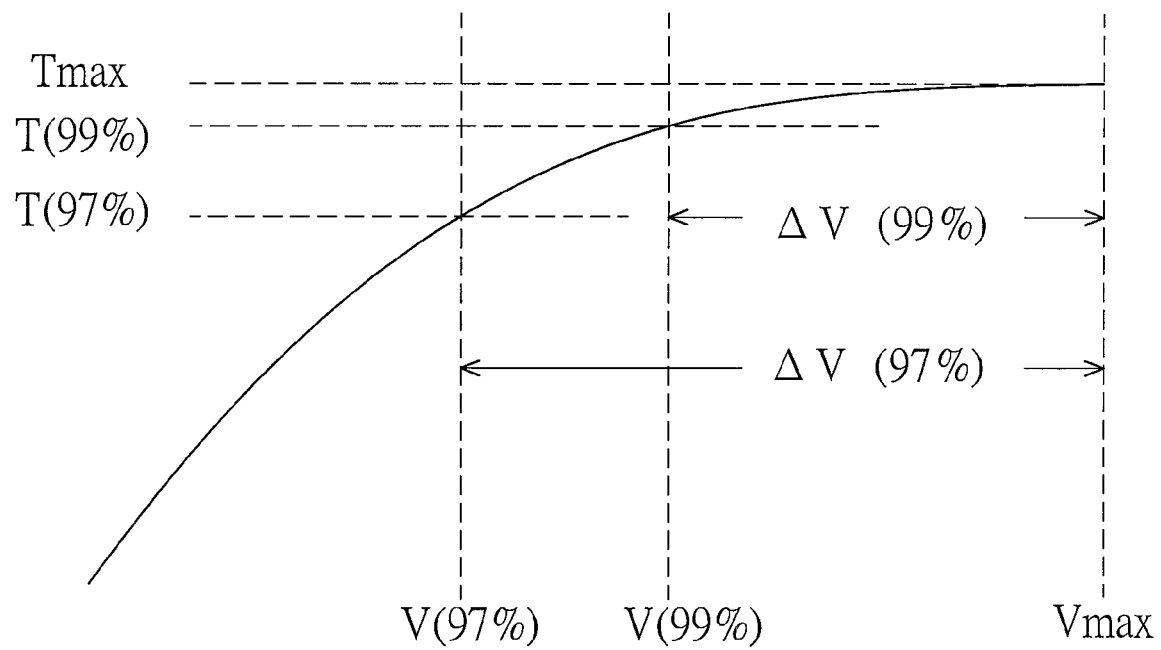
FIG. 3C is an enlarged view of the effective voltage-transmittance (V-T) curve shown in FIG. 3B.

FIG. 3C is an enlarged view of the effective voltage-transmittance (V-T) curve shown in FIG. 3B. Referring to FIG. 3B, a Kerr constant of the quasi-isotropic liquid crystal layer is 1e-8, the quasi-isotropic liquid crystal layer is driven by a driving voltage V, and the driving voltage V is between a driving voltage interval defined by a minimum driving voltage Vmin and a maximum driving voltage Vmax. The transmittance of the quasi-isotropic liquid crystal layer within each of the sub-pixel units is Tmax when the quasi-isotropic liquid crystal layer is driven by the maximum driving voltage Vmax. When the transmittance of the quasi-isotropic liquid crystal layer within each of the sub-pixel units is 99%*Tmax (i.e. T(99%)), a voltage difference between the driving voltage V (i.e. V(99%)) and the maximum driving voltage Vmax is $\Delta V(99\%)$, and $(\Delta V(99\%)/Vmax)>2.9\%$. In addition, when the transmittance of the quasi-isotropic liquid crystal layer within each of the sub-pixel units is 97%*Tmax (i.e. T(97%)), a voltage difference between the driving voltage V (i.e. V(97%)) and the maximum driving voltage Vmax is $\Delta V(97\%)$, and $(\Delta V(97\%)/Vmax)>5.4\%$.

Take the quasi-isotropic liquid crystal layer with a Kerr constant of 1e-9 as an example, the quasi-isotropic liquid crystal layer is driven by a driving voltage V, and the driving voltage V is between a driving voltage interval defined by a minimum driving voltage Vmin and a maximum driving voltage Vmax. The transmittance of the quasi-isotropic liquid crystal layer within each of the sub-pixel units is Tmax when the quasi-isotropic liquid crystal layer is driven by the maximum driving voltage Vmax. When the transmittance of the quasi-isotropic liquid crystal layer within each of the sub-pixel units is 99%*Tmax (i.e. T(99%)), a voltage difference between the driving voltage V (i.e. V(99%)) and the maximum driving voltage Vmax is $\Delta V(99\%)$, and $(\Delta V(99\%)/Vmax)>3.8\%$. In addition, when the transmittance of the quasi-isotropic liquid crystal layer within each of the sub-pixel units is 97%*Tmax (i.e. T(97%)), a voltage difference between the driving voltage V (i.e. V(97%)) and the maximum driving voltage Vmax is $\Delta V(97\%)$, and $(\Delta V(97\%)/Nmax)>6.4\%$.

The Second Embodiment

Figure 4:
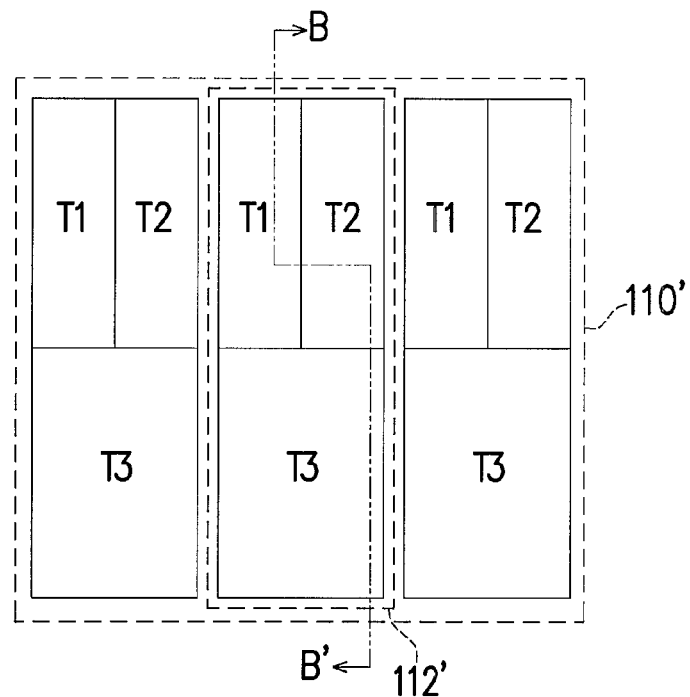
FIG. 4 is a schematic view of a liquid crystal display unit according to the second embodiment of the present invention.
Figure 4:
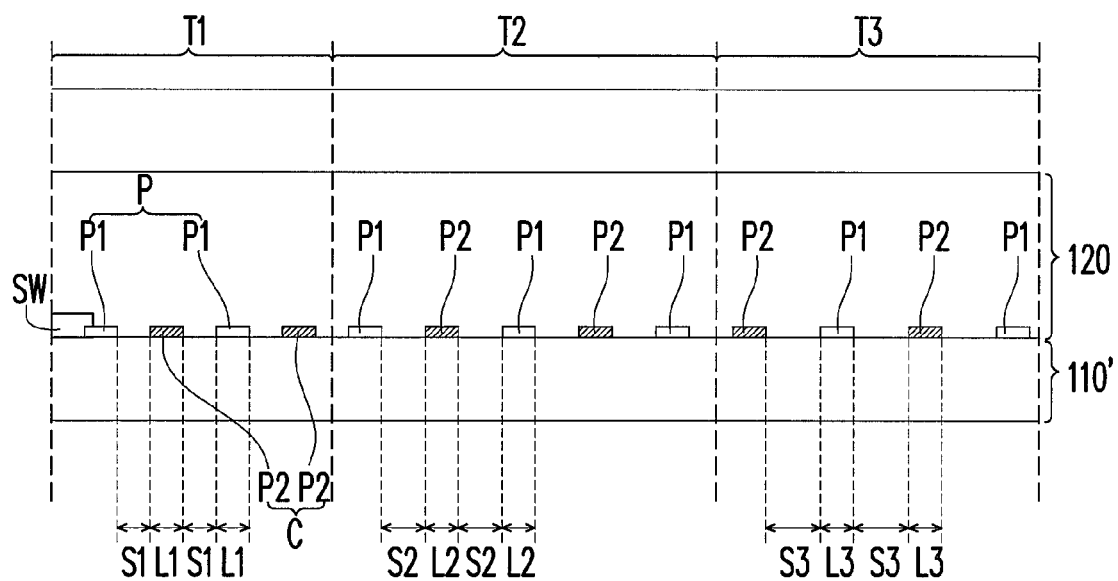

FIG. 4 is a schematic view of a liquid crystal display unit according to the second embodiment of the present invention. Referring to FIG. 2 and FIG. 4, the pixel unit 110' of the present embodiment is similar with the pixel unit 110 of the first embodiment except that each of the sub-pixel unit 112' of the present embodiment includes a first transmissive region T1, a second transmissive region T2 and a third transmissive region T3. In the third transmissive region T3, a width of each of the first stripe patterns P1 is L3, while a gap between each of the first stripe patterns P1 and one of the second stripe patterns P2 adjacent thereto is S3, wherein L1≠L2≠L3 or S1≠S2≠S3 or L1/S1≠L2/S2≠L3/S3. In the third transmissive regions T3, the width of each of the second stripe patterns P2 is substantially equal to that of each of the first stripe patterns P1 (i.e. both of P1 and P2 are equal to L3). However, in other embodiment of the present application, the width of each of the second stripe patterns P2 may not equal to that of each of the first stripe patterns P1.

In the present embodiment, the switch SW of each of the sub-pixel units 112' includes one thin film transistor electrically connected to the first stripe patterns P1. In other words, the first stripe patterns P1 in the first transmissive regions T1, the second transmissive regions T2 and the third transmissive regions T3 of the sub-pixel units 112' are electrically connected to the same transistor and have substantially the same voltage level. However, the quantity and structure of the transistor used in the present application is not limited.

In other embodiments of the present application, parts of the first stripe patterns P1 located within the first transmissive region T1 constitute one sub-pixel electrode, another parts of the first stripe patterns P1 located within the second transmissive region T2 constitute another sub-pixel electrode, the other parts of the first stripe patterns P1 located within the third transmissive region T3 constitute the other sub-pixel electrode. Said three sub-pixel electrodes located within the first transmissive region T1, the second transmissive region T2 and the third transmissive region T3 are electrically insulated from each other. In order to individually drive said three sub-pixel electrodes located within the first transmissive region T1, the second transmissive region T2 and the third transmissive region T3, the switch SW of each of the sub-pixel units 112' includes three thin film transistors, wherein one of the thin film transistors is electrically connected to one of the sub-pixel electrodes located within the first transmissive region T1, another one of the thin film transistors is electrically connected to another one of the sub-pixel electrodes located within the second transmissive region T2, the other one of the thin film transistors is electrically connected to the other one of the sub-pixel electrodes located within the third transmissive region T3. As mentioned above, the quantity of sub-pixel electrodes of the sub-pixel units 112' is not limited in the present application, one ordinary skilled in the art may properly modify the layout of the sub-pixel units 112' according to design requirements of products.

In the present embodiment, in the first transmissive regions T1, the second transmissive regions T2 and the third transmissive regions T3, widths of the first stripe patterns P1 and the second stripe patterns P2 are similar or substantially the same, i.e. L1≈L2≈L3. The gap between each of the first stripe patterns P1 in the first transmissive regions T1 and one of the second stripe patterns P2 adjacent thereto is different from gap between each of the first stripe patterns P1 in the second transmissive regions T2 and one of the second stripe patterns P2 adjacent thereto. In addition, the gap between each of the first stripe patterns P1 in the second transmissive regions T2 and one of the second stripe patterns P2 adjacent thereto is different from gap between each of the first stripe patterns P1 in the third transmissive regions T3 and one of the second stripe patterns P2 adjacent thereto. In other words, L1/S1≠L2/S2≠L3/S3. For example, widths L1, L2 and L3 are about 3 micrometers, gap S1 is about 3 micrometers, gap S2 is about 4 micrometers, and gap S3 is about 5 micrometers. In other words, width/gap ratio L1/S1 is about 3 micrometers/3 micrometers, width/gap ratio L2/S2 is about 3 micrometers/4 micrometers, and width/gap ratio L3/S3 is about 3 micrometers/5 micrometers. However, the first stripe patterns P1 and the second stripe patterns P2 in the first transmissive regions T1, the second transmissive regions T2 and the third transmissive regions T3 used in the present application are not limited to have the same width, any values of L1, S1, L2, S2, L3, and S3 that satisfy the relationships L1≠L2, S1≠S2 or L1/S1≠L2/S2≈L3/S3 are fallen within the scope of the invention.

In one embodiment of the invention, when L1/S1≠L2/S2≠L3/S3, a voltage-transmittance curve VT1 of the quasi-isotropic liquid crystal layer 120 within the first transmissive regions T1, a voltage-transmittance curve VT2 of the quasi-isotropic liquid crystal layer 120 within the second transmissive regions T2 and a voltage-transmittance curve VT3 of the quasi-isotropic liquid crystal layer 120 within the third transmissive regions T3 are different from each other. Since the areas of the first transmissive region T1, the second transmissive region T2 and the third transmissive region T3 of each of the sub-pixel units 112' is small, the first transmissive regions T1, the second transmissive region T2 and the third transmissive regions T3 are difficult to be identified by human eyes. The gray level displayed by each of the sub-pixel units 112' is related to the effective voltage-transmittance curve VT thereof, and the effective voltage-transmittance curve VT of the quasi-isotropic liquid crystal layer 120 in the sub-pixel units 112' is related to the voltage-transmittance curve VT1, the voltage-transmittance curve VT2, the voltage-transmittance curve VT3, area of the first transmissive regions T1 of each of the sub-pixel units 112', area of the second transmissive regions T2 of each of the sub-pixel units 112', and area of the third transmissive regions T3 of each of the sub-pixel units 112'. Specifically, the effective voltage-transmittance curve VT of the quasi-isotropic liquid crystal layer 120 in each of the sub-pixel unit 112' can be estimated by the following formula (2).

$$VT=[(VT1 \times A1)+(VT2 \times A2)+(VT3 \times A3)]/(A1+A2+A3) \quad (2)$$

It is note that the area A1 of the first transmissive region T1, the area A2 of the second transmissive region T2 and the area A3 of the third transmissive region T3 are not necessary to be the same. By properly modified the areas of the first transmissive regions T1, the second transmissive regions T2 and the third transmissive regions T3 in accordance with design requirements of products, one ordinary skilled in the art can obtain desired effective voltage-transmittance curve VT.

By adjusting L/S ratio of the pixel electrodes, transmissive regions having different VT curves may be obtained by the present application and the effective VT curve of liquid crystal display units may be optimized.

EXPERIMENTAL EXAMPLE

Figure 5:
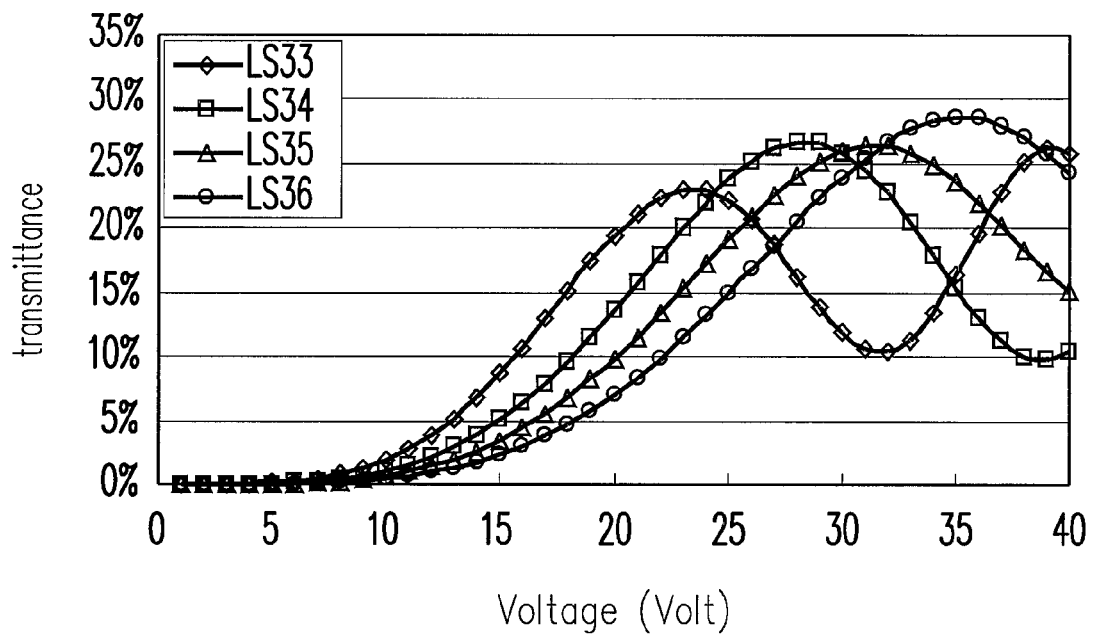
FIG. 5 and FIG. 6 illustrate experimental data of other embodiments of the present invention.
Figure 6:
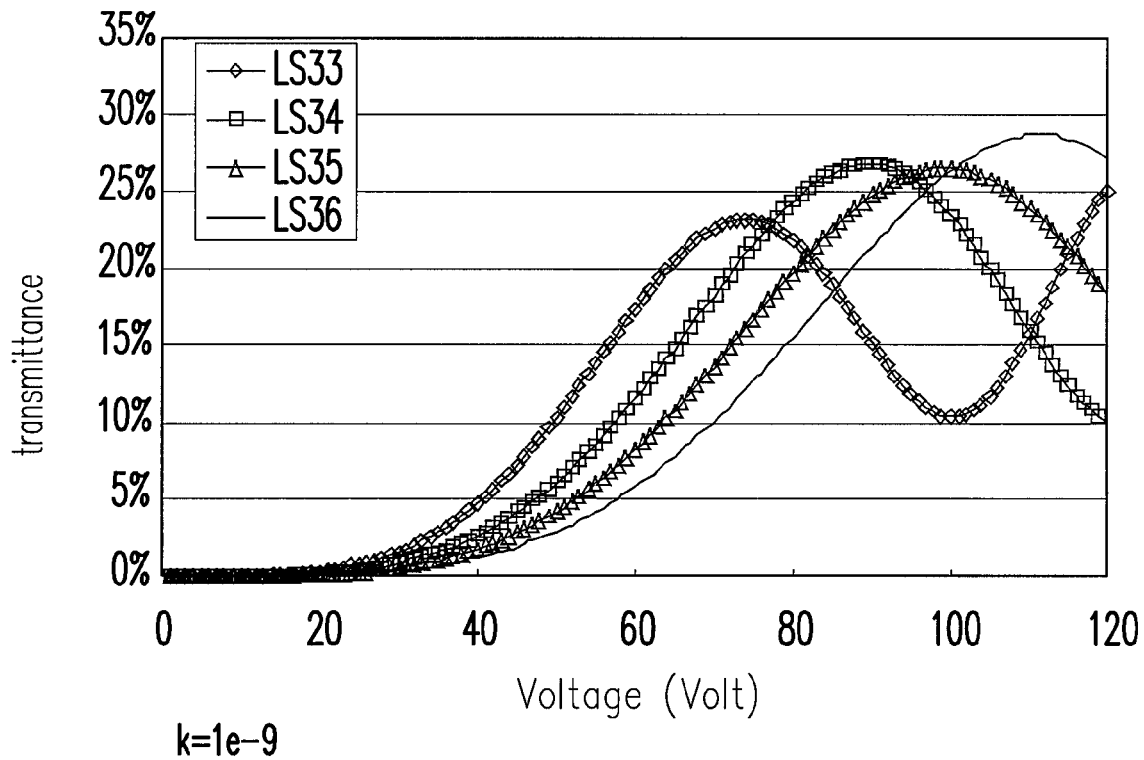

FIG. 5 and FIG. 6 illustrate experimental data of other embodiments of the present invention. Referring to FIG. 5, take the quasi-isotropic liquid crystal layer with Kerr constant of 1e-8 as an example, when width/gap (L/S) ratio of stripe patterns is about 3 micrometers/3 micrometers (i.e. LS33), the maximum driving voltage Vmax is about 23 volts, ΔV(99%)/Vmax is about 1.70%, and ΔV(97%)/Vmax is about 4.80%; when width/gap (L/S) ratio of stripe patterns is about 3 micrometers/4 micrometers (i.e. LS34), the maximum driving voltage Vmax is about 28 volts, ΔV(99%)/Vmax is about 2.10%, and ΔV(97%)/Vmax is about 4.60%; when width/gap (L/S) ratio of stripe patterns is about 3 micrometers/5 micrometers (i.e. LS35), the maximum driving voltage Vmax is about 31 volts, ΔV(99%)/Vmax is about 2.30%, and ΔV(97%)/Vmax is about 4.80%; and when width/gap (L/S) ratio of stripe patterns is about 3 micrometers/6 micrometers (i.e. LS36), the maximum driving voltage Vmax is about 35 volts, ΔV(99%)/Vmax is about 2.90%, and ΔV(97%)/Vmax is about 5.40%. Obviously, when width/gap (L/S) ratio of stripe patterns is about 3 micrometers/3 micrometers (i.e. LS33), 3 micrometers/4 micrometers (i.e. LS34), 3 micrometers/5 micrometers (i.e. LS35) or 3 micrometers/6 micrometers (i.e. LS36), the values of V(99%)/Vmax are all lower than 2.90% while the values of ΔV(97%)/Vmax are all lower than 5.40%. Accordingly, when the stripe patterns of the pixel electrode has single width/gap (L/S) ratio, the transmittance of the quasi-isotropic liquid crystal layer is sensitive to the shift of the maximum driving voltage Vmax.

In embodiments of the present invention, when area ratio of different transmissive regions that are respectively occupied by stripe patterns having 3 micrometers/3 micrometers (i.e. LS33), 3 micrometers/4 micrometers (i.e. LS34), 3 micrometers/5 micrometers (i.e. LS35) and 3 micrometers/6 micrometers (i.e. LS36) is about 1:1:4:0, the maximum driving voltage Vmax is about 30 volts, V(99%)/Vmax is about 4.87%, and ΔV(97%)/Vmax is about 8.10%; when area ratio of different transmissive regions that are respectively occupied by stripe patterns having 3 micrometers/3 micrometers (i.e. LS33), 3 micrometers/4 micrometers (i.e. LS34), 3 micrometers/5 micrometers (i.e. LS35) and 3 micrometers/6 micrometers (i.e. LS36) is about 1:0:2.3:0.3, the maximum driving voltage Vmax is about 34 volts, V(99%)/Vmax is about 15.47%, and ΔV(97%)Nmax is about 19.71%; and when area ratio of different transmissive regions that are respectively occupied by stripe patterns having 3 micrometers/3 micrometers (i.e. LS33), 3 micrometers/4 micrometers (i.e. LS34), 3 micrometers/5 micrometers (i.e. LS35) and 3 micrometers/6 micrometers (i.e. LS36) is about 1:0.4:2.6:0.2, the maximum driving voltage Vmax is about 30 volts, V(99%)/Vmax is about 6.30%, and ΔV(97%)/Vmax is about 9.80%. Accordingly, when the stripe patterns of the pixel electrode has multiple width/gap (L/S) ratios, the transmittance of the quasi-isotropic liquid crystal layer is insensitive to the shift of the maximum driving voltage Vmax.

Referring to FIG. 6, take the quasi-isotropic liquid crystal layer with Kerr constant of 1e-9 as an example, when width/gap (L/S) ratio of stripe patterns is about 3 micrometers/3 micrometers (i.e. LS33), the maximum driving voltage Vmax is about 74 volts, ΔV(99%)/Vmax is about 3.40%, and ΔV(97%)Nmax is about 5.90%; when width/gap (L/S) ratio of stripe patterns is about 3 micrometers/4 micrometers (i.e. LS34), the maximum driving voltage Vmax is about 90 volts, ΔV(99%)/Vmax is about 3.80%, and ΔV(97%)/Vmax is about 6.40%; when width/gap (L/S) ratio of stripe patterns is about 3 micrometers/5 micrometers (i.e. LS35), the maximum driving voltage Vmax is about 99 volts, ΔV(99%)/Vmax is about 3.20%, and ΔV(97%)/Vmax is about 5.90%; and when width/gap (L/S) ratio of stripe patterns is about 3 micrometers/6 micrometers (i.e. LS36), the maximum driving voltage Vmax is about 111 volts, ΔV(99%)/Vmax is about 3.10%, and ΔV(97%)/Vmax is about 5.70%. Obviously, when width/gap (L/S) ratio of stripe patterns is about 3 micrometers/3 micrometers (i.e. LS33), 3 micrometers/4 micrometers (i.e. LS34), 3 micrometers/5 micrometers (i.e. LS35) or 3 micrometers/6 micrometers (i.e. LS36), the values of V(99%)Nmax are all lower than 3.8% while the values of ΔV(97%)/Vmax are all lower than 6.40%. Accordingly, when the stripe patterns of the pixel electrode has single width/gap (L/S) ratio, the transmittance of the quasi-isotropic liquid crystal layer is sensitive to the shift of the maximum driving voltage Vmax.

In embodiments of the present invention, when area ratio of different transmissive regions that are respectively occupied by stripe patterns having 3 micrometers/3 micrometers (i.e. LS33), 3 micrometers/4 micrometers (i.e. LS34), 3 micrometers/5 micrometers (i.e. LS35) and 3 micrometers/6 micrometers (i.e. LS36) is about 2:5:0.4:0, the maximum driving voltage Vmax is about 96 volts, V(99%)/Vmax is about 6.70%, and ΔV(97%)/Vmax is about 10.50%; when area ratio of different transmissive regions that are respectively occupied by stripe patterns having 3 micrometers/3 micrometers (i.e. LS33), 3 micrometers/4 micrometers (i.e. LS34), 3 micrometers/5 micrometers (i.e. LS35) and 3 micrometers/6 micrometers (i.e. LS36) is about 2:0:3:3, the maximum driving voltage Vmax is about 109 volts, V(99%)/Vmax is about 14.00%, and ΔV(97%)/Vmax is about 18.90%; and when area ratio of different transmissive regions that are respectively occupied by stripe patterns having 3 micrometers/3 micrometers (i.e. LS33), 3 micrometers/4 micrometers (i.e. LS34), 3 micrometers/5 micrometers (i.e. LS35) and 3 micrometers/6 micrometers (i.e. LS36) is about 2:0.2:4.2:0.8, the maximum driving voltage Vmax is about 110 volts, V(99%)/Vmax is about 18.40%, and ΔV(97%)/Vmax is about 22.00%. Accordingly, when the stripe patterns of the pixel electrode has multiple width/gap (L/S) ratios, the transmittance of the quasi-isotropic liquid crystal layer is insensitive to the shift of the maximum driving voltage Vmax.

It will be apparent to those skilled in the art that various modifications and variations can be made to the structure of the present invention without departing from the scope or spirit of the present invention. In view of the foregoing, it is intended that the present invention cover modifications and variations of the present invention provided they fall within the scope of the following claims and their equivalents.

What is claimed is:

1. A liquid crystal display unit, comprising:
    a pixel unit comprising a plurality of sub-pixel units, each of the sub-pixel units at least having a first transmissive region and a second transmissive region, each of the sub-pixel units comprising:
        a switch;
        a pixel electrode electrically connected to the switch and having a plurality of first stripe patterns;
        a common electrode electrically insulated from the pixel electrode and having a plurality of second stripe patterns, the first stripe patterns and the second stripe patterns being arranged alternately, in the first transmissive region, a width of each of the first stripe patterns is L1, and a gap between each of the first stripe patterns and one of the second stripe patterns adjacent thereto is S1, in the second transmissive regions, a width of each of the first stripe patterns is L2, and a gap between each of the first stripe patterns and one of the second stripe patterns adjacent thereto is S2, wherein L1≠L2 or S1≠S2 or L1/S1≠L2/S2; and
    a quasi-isotropic liquid crystal layer disposed above the sub-pixel units, the quasi-isotropic liquid crystal layer being optically isotropic when no voltage is applied thereto, and the quasi-isotropic liquid crystal layer being optically anisotropic when a driving voltage is applied thereto.

2. The liquid crystal display unit of claim 1, wherein the switch includes a thin film transistor, and the first stripe patterns are electrically connected.

3. The liquid crystal display unit of claim 1, wherein the switch includes two thin film transistors, the first stripe patterns is divided into two sub-pixel electrodes electrically insulated from each other, each of the thin film transistors is electrically connected to one of the sub-pixel electrodes respectively, and parts of the first stripe patterns belonging to a same sub-pixel electrode are electrically connected.

4. The liquid crystal display unit of claim 1, wherein one of the sub-pixel electrodes is located in one of the first transmissive regions, and the other one of the sub-pixel electrodes is located in one of the second transmissive regions.

5. The liquid crystal display unit of claim 1, wherein each of the sub-pixel units further includes a third transmissive region, in the third transmissive regions, a width of each of the first stripe patterns is L3, while a gap between each of the first stripe patterns and one of the second stripe patterns adjacent thereto is S3, wherein L1/S1≠L2/S2≠L3/S3.

6. The liquid crystal display unit of claim 5, wherein the switch includes a thin film transistor, and the first stripe patterns are electrically connected.

7. The liquid crystal display unit of claim 5, wherein the switch includes three thin film transistors, the first stripe patterns is divided into three sub-pixel electrodes electrically insulated from each other, each of the thin film transistors is electrically connected to one of the sub-pixel electrodes respectively, and parts of the first stripe patterns belonging to a same sub-pixel electrode are electrically connected.

8. The liquid crystal display unit of claim 5, wherein L1=L2=L3 and S1≠S2≠S3.

9. The liquid crystal display unit of claim 5, wherein a voltage-transmittance curve VT1 of the quasi-isotropic liquid crystal layer within the first transmissive regions, a voltage-transmittance curve VT2 of the quasi-isotropic liquid crystal layer within the second transmissive regions and a voltage-transmittance curve VT3 of the quasi-isotropic liquid crystal layer within the third transmissive regions are different from each other.

10. The liquid crystal display unit of claim 9, wherein an area of each of the first transmissive regions is A1, an area of each of the second transmissive regions is A2, an area of each of the third transmissive regions is A3, and an effective voltage-transmittance curve VT of the quasi-isotropic liquid crystal layer within each of the sub-pixel units equals to [(VT1×A1)+(VT2×A2)+(VT3×A3)]/(A1+A2+A3).

11. The liquid crystal display unit of claim 5, wherein a Kerr constant of the quasi-isotropic liquid crystal layer is 1e-8, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 99%*Tmax, a voltage difference between the driving voltage V and the maximum driving voltage Vmax is ΔV, and (ΔV/Vmax)>2.9%.

12. The liquid crystal display unit of claim 5, wherein a Kerr constant of the quasi-isotropic liquid crystal layer is 1e-8, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 97%*Tmax, a voltage difference between the driving voltage V and the maximum driving voltage Vmax is ΔV, and (ΔV/Vmax)>5.4%.

13. The liquid crystal display unit of claim 5, wherein a Kerr constant of the quasi-isotropic liquid crystal layer is 1e-9, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 99%*Tmax, a voltage difference between the driving voltage V and the maximum driving voltage Vmax is ΔV, and (ΔV/Vmax)>3.8%.

14. The liquid crystal display unit of claim 5, wherein a Kerr constant of the quasi-isotropic liquid crystal layer is 1e-9, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 97%*Tmax, a voltage difference between the driving voltage V and the maximum driving voltage Vmax is ΔV, and (ΔV/Vmax)>6.4%.

15. The liquid crystal display unit of claim 1, wherein L1=L2 and S1≠S2.

16. The liquid crystal display unit of claim 1, wherein an area of each of the first transmissive regions is substantially equal to that of each of the second transmissive regions.

17. The liquid crystal display unit of claim 1, wherein an area of each of the first transmissive regions is different from that of each of the second transmissive regions.

18. The liquid crystal display unit of claim 1, wherein the quasi-isotropic liquid crystal layer is a blue phase liquid crystal layer.

19. The liquid crystal display unit of claim 1, wherein a voltage-transmittance curve VT1 of the quasi-isotropic liquid crystal layer within the first transmissive regions is different from a voltage-transmittance curve VT2 of the quasi-isotropic liquid crystal layer within the second transmissive regions.

20. The liquid crystal display unit of claim 19, wherein an area of each of the first transmissive regions is A1, an area of each of the second transmissive regions is A2, and an effective voltage-transmittance curve VT of the quasi-isotropic liquid crystal layer within each of the sub-pixel units equals to [(VT1×A1)+(VT2×A2)]/(A1+A2).

21. The liquid crystal display unit of claim 1, wherein a Kerr constant of the quasi-isotropic liquid crystal layer is 1e-8, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 99%*Tmax, a voltage difference between the driving voltage V and the maximum driving voltage Vmax is ΔV, and (ΔV/Vmax)>2.9%.

22. The liquid crystal display unit of claim 1, wherein a Kerr constant of the quasi-isotropic liquid crystal layer is 1e-8, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 97%*Tmax, a voltage difference between the driving voltage V and the maximum driving voltage Vmax is ΔV, and (ΔV/Vmax)>5.4%.

23. The liquid crystal display unit of claim 1, wherein a Kerr constant of the quasi-isotropic liquid crystal layer is 1e-9, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 99%*Tmax, a voltage difference between the driving voltage V and the maximum driving voltage Vmax is ΔV, an (ΔV/Vmax)>3.8%.

24. The liquid crystal display unit of claim 1, wherein a Kerr constant of the quasi-isotropic liquid crystal layer is 1e-9, the quasi-isotropic liquid crystal layer is driven by a driving voltage V, and the driving voltage V is between a driving voltage interval defined by a minimum driving voltage Vmin and a maximum driving voltage Vmax; the transmittance of the quasi-isotropic liquid crystal layer within each of the sub-pixel units is Tmax when the quasi-isotropic liquid crystal layer is driven by the maximum driving voltage Vmax; and when the transmittance of the quasi-isotropic liquid crystal layer within each of the sub-pixel units is 97%*Tmax, a voltage difference between the driving voltage V and the maximum driving voltage Vmax is ΔV, and (ΔV/Vmax)>6.4%.

25. The liquid crystal display unit of claim 1, wherein a birefringence (Δn) of the quasi-isotropic liquid crystal layer is proportional to an electric field (E) between the pixel electrode and the common electrode, or a birefringence (Δn) of the quasi-isotropic liquid crystal layer is proportional to square of an electric field ($E^2$) between the pixel electrode and the common electrode.

\* \* \* \* \*